Figure 5:
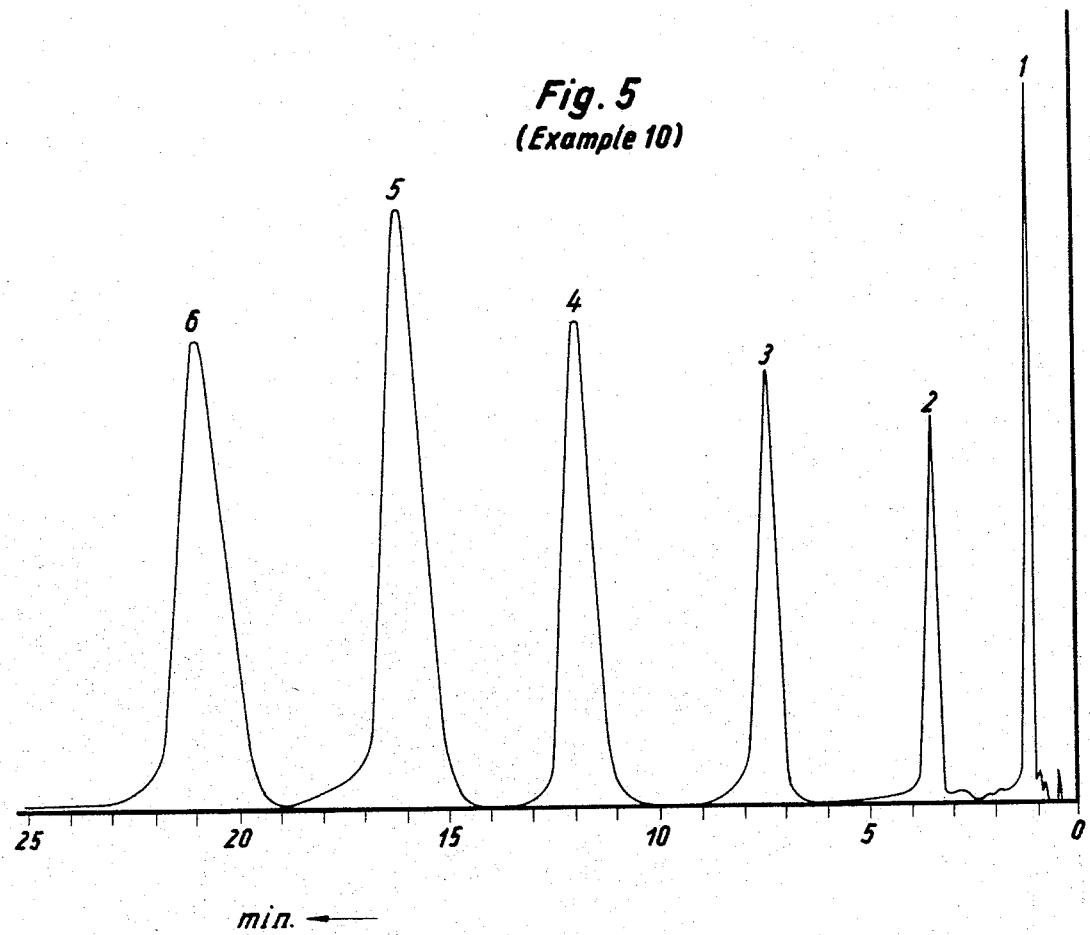

Sept. 5, 1967    I. HALASZ ET AL    3,340,085
GAS CHROMATOGRAPHIC SEPARATING MATERIAL
Filed Oct. 21, 1963    2 Sheets-Sheet 1

(Example 10)

min. ←

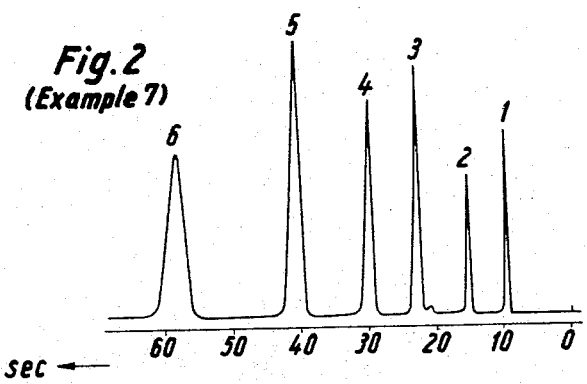
Fig. 2 (Example 7)
sec ←
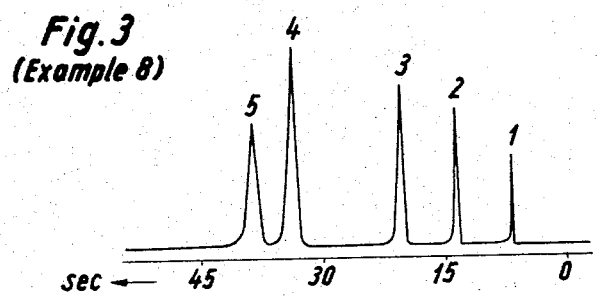
Fig. 3 (Example 8)
sec ←
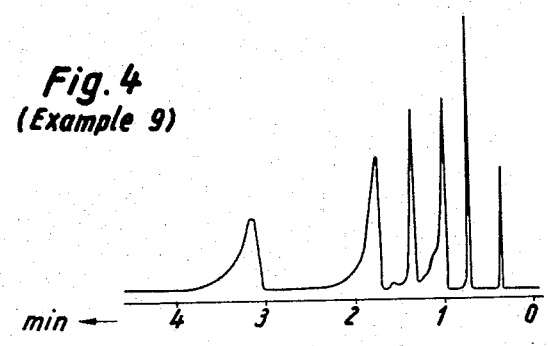
Fig. 4 (Example 9)
min ←

3,340,085
GAS CHROMATOGRAPHIC SEPARATING
MATERIAL
Istvan Halasz and Csaba Horvath, Frankfurt am Main,
Germany, assignors to The Perkin Elmer Corporation,
Norwalk, Conn.
Filed Oct. 21, 1963, Ser. No. 317,715
Claims priority, application Germany, Oct. 23, 1962,
H 47,197
10 Claims. (Cl. 117—26)

This invention relates to the art of gas chromatography, and is concerned with improvements in packed columns for gas chromatographic separations and other operations conducted by gas chromatography. The invention is particularly directed to the provision of improved packing materials for use in such packed columns.

Gas chromatographic separating columns with a packing of grains of a porous substance are known. In some cases the surfaces of the grains were adsorptive per se, while in other cases they were wetted with a separating liquid. In the latter case, the grains of the packing consisted of inert material. Also, tiny glass beads wetted with a separating liquid have been used as packing for gas chromatographic columns. Columns of this type offer the advantage of a small pressure loss and a relatively high permissible streaming velocity, due to the uniform size and shape of the packing material. Their disadvantage lies in the fact that the wettability of the small specific surface of the beads is so low that not much liquid can be applied to them, and hence their absorptive capacity is low. An attempt has been made to overcome this disadvantage by using little beads of hard-burned clay, wetted with the separating liquid after burning. The results achieved with such packings did not, however, warrant the increased expenditure in work and energy, the reason being mainly that only the advantageous geometric flow conditions could be achieved, but not an advantageous modification of the surface properties of the packing material.

Also, there had been proposed a separating column having a packing consisting of gas-impervious grains carrying porous layers on their surfaces. The porous layer consisted of inactive (inert) solid material, and either was formed in situ by a chemical reaction with a substance of the gas-impervious body on its surface, or was fixed to the surfaces of the gas-impervious bodies by a special treatment, especially by burning them on at high temperature (500–1000° C.). The porous inactive solid layer served only as a support for the active separating liquid.

An object of the present invention is to provide an improved packing material for a gas chromatographic column. A further inventive object is to provide a packing material characterized not only by small pressure loss and relatively high permissive streaming velocity but also by a relatively high adsorptive capacity. These and other inventive objects are attained by observing the principles of the present invention as hereinafter disclosed.

The invention concerns a column for the separation of substances according to gas chromatographic principles, said column containing a packing of gas-impervious bodies carrying porous layers on their surfaces. According to the invention the porous surface layer on the gas-impervious bodies consists of active adsorbing material. The main difference between the inventive columns and the known columns is, therefore, that the porous surface layer not only serves as a support for another, liquid, material to be applied additionally onto the grains (although such additional application of a separating liquid is not to be excluded from the scope of the present invention), but that the porous layer per se consists of active adsorbent material, within which the separation process proceeds at least partially. Such columns are made possible by the surprising discovery that a porous layer of active, adsorbent solid material has in itself sufficient adhesive capacity to adhere to the gas-impervious core without an aftertreatment at very high temperatures as was believed necessary heretofore. According to the invention it is not necessary to ensure adhesion of the porous layer by burning it on. Such high temperature (500–1000° C.) treatment substantially destroys the adsorptive activity of the adsorbent material. Although some specific embodiments—which will be explained in greater detail as the description proceeds—encompass a mild aftertreatment at somewhat elevated temperatures, such aftertreatment is conducted at much lower temperatures than the aforesaid "burning-on" treatment had necessitated, i.e., treatment at a temperature within the range 100–300° C. as contrasted with the 500–1000° C. temperature required for the burning-on technique. Such low temperature treatment does not diminish the adsorptive power and activity of the adsorbent material.

It is possible also, according to the invention, to combine a normally solid adsorptive agent with a separating liquid and to apply such a combination, e.g. iron oxide with triethylene glycol, or $TiO_2$ with "squalan" or $Al_2O_3$ with $\beta,\beta'$-dinitrilo ethyl ether, etc., as a compound active layer onto the surfaces of inactive cores of the packing material. Thereby completely new and advantageous separating results, as contrasted with those of known columns, are achieved.

Columns with a packing of bodies with an inactive core and a surface layer of active material according to the invention are useful not only for gas chromatographic separations, but also they can advantageously be used to determine surface and other adsorption properties of any solid substance used as the active layer. Adsorption isotherms, heats of adsorption, specific surfaces, etc., can be determined with the inventive packed columns according to gas chromatographic principles known per se.

Heretofore only a limited number of solid substances had been used for gas chromatographic investigations of this kind. These were substances having a certain definite grain size and surface properties—usually already known from other measurements. As there was no known process to bring any powder whatsoever into a form suitable for such gas chromatographic investigation, the theoretically known principles of determining the surface properties of solids by frontal analysis or by a chromatogram could in most cases not be realized heretofore, although this possibility would offer great advantages in practice, e.g. in the pigment industry. This method could also considerably simplify the current testing of substances during their fabrication. The instant method of applying active coatings of practically any solid body, in sufficiently finely comminuted form, i.e., with grain sizes smaller than 1 micron, makes it possible to use these methods for the investigation of the surface properties of any solid substance in finely divided form.

The fabrication of a column with a packing of bodies consisting of a gas-impervious core and an adhering thin porous layer of an active adsorbing solid body can be performed according to one or another of several methods forming further embodiments of the present invention. According to one of these methods, the surface layer as well as the particles forming it are prepared in the presence of the carrier bodies (cores), such carrier bodies preferably having a spherical shape. A suitable chemical reaction is performed the reaction product of which supplies the desired particles or particles of an intermediate substance from which the particles of the final layer can be formed by a subsequent chemical and/or physical reaction, in the form of a precipitate. The reaction is performed in the presence of the carrier beads, so that the reaction product can precipitate on the surfaces of the beads.

The product thus obtained is, after drying, either directly usable as column packing material or it can be transformed into the desired chemical and/or physical state by a moderate heating to a temperature so low as not to endanger the surface activity and adsorptivity of the surface layer. The definitive stationary phase can also be produced by modifying the thin solid layer (thickness about 1 micron or less) with a high-boiling separating liquid, thus increasing its thickness.

Another embodiment of the invention for producing the packing material is applicable if the solid substance from which the surface layer shall be formed is already at hand. Such solid material, if not already in a sufficiently finely divided form, must first be subdivided to a fineness corresponding to a grain size of smaller than $10\mu$ and preferably smaller than $0.1–0.01\mu$ such as is usual for carbon black, $SiO_2$ produced by burning in the vapor phase, etc.

In both embodiments the material of the inert cores is to be so chosen that the layer forming the active solid substance adheres to its surface either in its pure form or modified with a high-boiling separating liquid. This condition is easy to fulfill, it being sufficient that the particles of the fine-grained solid from which the surface layer is to be formed are suspended in a dispersing liquid (preferably of low boiling point and high density) and that the dispersing liquid not only wets these particles but also the surfaces of the (preferably spherical) inert core material. The dispersing or suspending liquid can also consist of a mixture of different solvents. Halogenated lower hydrocarbons such as $CCl_4$, $CHCl_3$, $CH_2Cl_2$, $CH_2Br_2$, $C_2F_3Cl_3$, etc., are very well suited for this purpose, but any liquid with a similarly low boiling point and high density, and which does not react unfavorably with either the substance of the core or of the surface layer, may also be used.

If the substance from which the surface layer is to be formed is already at hand (of course in sufficiently fine subdivision) a paste or dough is formed from such powder and a suitable dispersive liquid, and the paste is applied onto the surface of the inert cores. The product is then dried under intensive mechanical agitation (shaking, rubbing, stirring, kneading, etc.), whereby the core beads are provided with an adherent coating. If, as sometimes happens, this coating is not of uniform thickness, the uniformity can be improved by rolling the spheres on a granulating disk or in a granulating drum, whereby the steady rubbing of the spheres against each other ensures the desired uniformity. By further addition of layer-forming powder during this treatment the layer thickness can be increased e.g. from about $5\mu$ to about $50\mu$.

Principally two different methods of producing layers, the adsorptive properties of which are modified by a separating liquid, are available.

(a) If the separating liquid is insoluble in the dispersing liquid, the powder is impregnated, in a manner known per se, with a solution of the separating liquid in a suitable low-boiling solvent, such as methanol, $CH_2Cl_2$ or the like, and this solvent is subsequently evaporated. The impregnated powder is then applied onto the surface of the inert cores in the manner described above (forming of paste with a dispersing liquid, etc.).

(b) If, on the other hand, the separating liquid is soluble in the dispersing liquid, it suffices to mix the powder with the dispersive liquid and the separating (modifying) liquid, and to apply the resulting paste onto the inert cores in the manner described.

It is not necessary to perform the forming of the paste and its application onto the cores in two separate operational steps. It is possible also to mix the cores with the ingredients of the stationary phase and the dispersive liquid, and to form the surface layer on the cores simultaneously in one step.

If only beads with very undesirable surface properties are available, they can be coated—prior to the application of the surface layer—e.g., with metals such as gold or silver, or with a varnish. The adhesive properties of the surface of the beads can also sometimes be improved by etching. In any case the packing material can be produced in the following manner:

Spheres with a uniform diameter, usually within the range of 0.05 to 0.30 mm. and preferably with a uniform size, with no greater deviations than $\pm 0.02$ mm. are used as cores. The material of which these cores are made is of no greater importance, as long as it is gas-impervious and inert. Glass or bronze serves well. These beads are coated with a very fine lacquer layer, thinner than $1\mu$, the lacquer being preferably firing varnish. The so-prepared beads are mixed with a small amount of powder of the substance from which the active layer is to be formed, so that its particles stick to the surfaces of the beads. The varnish is then burned in. The resulting beads are then provided with the actual surface layer of the paste in the manner described above, whereby the solid particles of the paste adhere onto the previously formed primary layer.

Instead of spheres, cores of another shape can also be used. As an alternative, cores of a shape common in distillery technique, such as Raschig rings, Berl saddles, Steadman packings, wire mesh rings and wire helices, etc. are operable, although spheres usually are first choice. They are provided with the surface layer by spraying them with a suspension, containing all of the components of the layer to be formed, in a suitable dispersive liquid, the latter being subsequently evaporated. Usually it is necessary, and always is advantageous, to keep the bodies in constant motion during such spraying operation.

The use of metals as inert cores gives the additional advantage that their good heat conductivity ensures a rapid dissipation of the heat of adsorption from the surface, thereby improving the adsorptive capacity of the column.

The invention is explained in a more detailed but non-limitative way by means of the following specific examples, in which all parts given in the examples are parts by weight and percentages are also percentages by weight.

Figure 1:
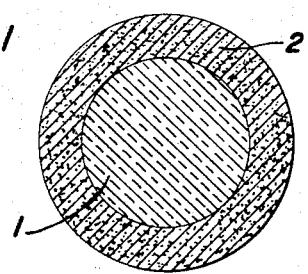

FIGURE 1 of the appended drawing is a cross-sectional view of a generally spherical packing unit embodying principles of the present invention. In the drawing, a gas-impermeable glass bead core is represented at 1, on the surface of which glass bead there is adhered a porous coating layer 2 of particulate active adsorptive material —in this case, highly subdivided $Al_2O_3$.

*Example 1*

8 parts of a highly dispersed $Al_2O_3$ (spec. surface $=106$ m.$^2$/g.) are thoroughly mixed with 30 parts $CHCl_3$ and 85 parts glass beads having a diameter of 0.10 to 0.12 mm., and dried under steady rubbing. The product is then transferred to a granulating disk the inclination and rotational speed of which are adjusted so that the spheres are kept in constant violent rotation. After 1 hour, 7 parts of the same $Al_2O_3$ are added slowly and the treatment is continued for a further hour. The product is then dried at 200° C. for 1 hour. The thickness of the active layer on the finished spheres is about $10–20\mu$.

*Example 2*

80 parts of tin bronze beads with an average diameter of 0.08 mm. are treated with 10 parts highly dispersed iron oxide (37 m.$^2$/g.) and a solution of 1 part triethylene glycol in 30 parts $CH_2Cl_2$ for 1.5 hrs. in an edge mill. The $CH_2Cl_2$ is thereby evaporated. Then 10 parts of iron oxide, previously modified by addition thereto of 10 parts triethyleneglycol and ground up to the original fineness, is added slowly and the treatment continued for 2 hours more. The product is then heated to 80° C. for 12 hours.

*Example 3*

25 parts of small wire mesh rings 1 x 1 mm. of stainless steel of the type "V₄A" are sprayed, whilst being violently shaken, with a mixture of 3 parts highly dispersed $ZrO_2$ (spec. surface 50 m.²/g.), 0.5 part "squalan" and 30 parts $CH_2Cl_2$, so that the suspension covers the whole surface of the rings after drying. An after treatment at 130° C. for one hour in order to eliminate the last traces of $CH_2Cl_2$, concludes the preparation of the product.

*Example 4*

30 parts of silver-coated glass beads with a diameter of 0.08 to 0.10 mm. are vigorously stirred into 100 parts of a 10% iron acetate solution, and 80 parts of an 8% aqueous ammoniacal solution are added slowly at 80° C. The mixture is then boiled for 1 hour, the product is filtered under suction, the filter cake is thoroughly mixed several times and is dried at 100° C. The layer is then equalized by aftertreatment on a granulating disk.

*Example 5*

20 parts of glass beads, diameter 0.08 to 0.10 mm., are wetted with a 2% solution of silicone resin, and 0.5 part of graphitized carbon black are brought onto their surface by thorough mixing. The product is heated for 2 hours at 300° C. After cooling, 4 further parts of graphitized carbon black are applied onto the surfaces in the manner described in Example 1.

*Example 6*

30 parts of an aqueous filtration cake of a finely divided pigment (Permanentviolett RL) with a water content of 80%, are triturated with 30 parts glass beads, diameter 0.10 to 0.12 mm., in a mortar. The product is then rolled for 1.5 hours on a granulating disk.

The superiority of columns produced according to the invention over conventional columns in demonstrated by the following Examples 7 to 10. Examples 7 and 8 concerns columns with a packing with an active solid layer modified by a separating liquid and Example 9 concerns a packing the active layer of which consists only of a solid without any separating liquid. As the time used for completing a gas chromatographic analysis is of primary importance, it is a general use to compare the qualities of gas chromatographic columns by the time necessary to complete an analysis on a test mixture.

*Example 7*

Highly dispersed $ZrO_2$ (specific surface 50 m.²/g.) was heated over night to 300° C. The ignition loss was 4%. 4.0 g. of the treated $ZrO_2$ was suspended by means of a rapid mixer in 150 cm.³ propyl ether, then 0.1 g. triethyleneglycol was added under cooling with ice and the stirring was continued for 5 minutes. Into the suspension 60 g. of glass beads (diameter 0.09 to 0.10 mm.) were added, shaken for 10 minutes and filtered under suction. The wet product was triturated until dry in a mortar and hereupon rolled for 20 minutes on a granulating disk. The product with a particle size of 0.09 to 0.10 mm. was sieved off and dried over night at 80° C.

A column with a length of 2 m. and an inner diameter of 2 mm. was filled with a packing thus obtained and a test mixture, consisting of (1) methane, (2) n-pentane, (3) n-hexane, (4) benzene, (5) n-heptane and (6) toluene was passed through the columns at a rate of 50 cm.³/min. (measured at 20° C.) at a temperature of 100° C. The amount of the test mixture used was 0.2 mm.³. A by-pass of 1:120 was used.

The obtained chromatogram is shown in FIGURE 2, from which it will be noted, that the whole analysis with very sharp peaks was completed in about 60 seconds.

*Example 8*

3.0 g. highly dispersed $Fe_2O_3$ with a specific surface of 106 m.²/g. and 0.3 g. triethyleneglycol were stirred together with 10 cm.³ $CH_2Cl_2$. The resulting paste was dried and the product was suspended under stirring with a rapid mixer in 150 cm.³ petrol ether (boiling range 40–70° C.). To this suspension 50 g. of glass beads (diameter 0.09 to 0.10 mm.) were added and shaken for 5 minutes. The product was filtered off under suction and triturated under addition of 10 cm.³ methanol. The air-dry product was then rolled for 20 minutes on a granulating disk. The product with a particle size of 0.09–0.10 mm. was dried over night at 80° C.

A column of 2 m. length and 2 mm. inner diameter was filled with this packing. 0.2 mm.³ of a test mixture consisting of (1) methane, (2) benzene, (3) toluene, (4) m- and p-xylene and (5) o-xylene was passed through the column at a rate of 77 cm.³/min. (measured at 20° C.) and a temperature of 100° C. A by-pass of 1:325 was used.

The chromatogram obtained is shown in FIGURE 3, from which it can be seen that the whole analysis was completed within about 40 seconds.

*Example 9*

50 g. of glass beads, diameter of 0.12 to 0.15 mm., were thoroughly mixed with a mixture of 1.5 g. firing varnish and 20 cm.³ $CH_2Cl_2$. The solvent was then evaporated under an infrared lamp.

0.35 g. graphitized carbon black were suspended in 150 cm.³ $CCl_4$ by means of a rapid mixer and the beads were shaken in this suspension for 5 minutes. The product was then filtered off under suction, triturated in a mortar, dried and thereafter heated to 300° C. for 1 hour.

0.5 g. of the same graphitized carbon black were suspended in 120 cm.³ $CCl_4$. The pretreated glass beads were shaken in this suspension for 5 minutes. The product with a particle size of 0.12 to 0.15 mm. was filtered off under suction, thoroughly triturated, sieved off and dried over night at 150° C.

A column with a length of 2 m. and an inner diameter of 2 mm. was filled with this packing. 0.1 mm.³ of a test mixture of (1) methane, (2) α-pinene, (3) cumarone, (4) mesitylene, (5) dimethyl aniline and (6) naphthalene was passed through the column at a rate of 10 cm.³/min. (measured at 20° C.) at a temperature of 240° C. A by-pass of 1:1,500 was used.

The chromatogram obtained is shown in FIGURE 4. It will be noted that the whole analysis was completed within about 3 minutes with mostly sharp peaks.

*Example 10*

As a comparison 5 mm.³ of a test mixture was passed at a rate of 50 cm.³/min. (measured at 20° C.) at a temperature of 90° C. through a conventional column with the about same dimensions as used in the Examples 7 to 9. The packing of this conventional column consisted of kieselguhr (60 to 100 mesh) impregnated with 25% by weight of fluorene picric acid.

The test mixture in the corresponding FIGURE 5 consisted of (1) cyclo hexane, (2) benzene, (3) toluene, (4) ethyl benzene, (5) p-xylene and (6) o-xylene. It will be noted, that here the peak of o-xylene does not appear before more than 20 minutes, whereas the same peak is obtained in Example 8 already within about 40 seconds.

Example 9 shows that even with a packing without any separating liquid a chromatogram of a mixture of relatively high boiling aromatic hydrocarbons can be obtained within about 3 minutes, whereas with conventional columns chromatograms of hydrocarbon mixtures containing substances higher than $C_4$ could not be obtained at all without the use of a separating liquid.

We claim:

1. Process of producing a packing material for chromatographic columns, which comprises coating inert gas-impervious cores with porous adsorptive surface layers consisting essentially of particles of actively adsorbent solid material and thereafter improving the uniformity of the coating layers on the coated cores by subjecting them to a rolling aftertreatment in a granulating drum or granulating disk, in which rolling operation additional powderous actively adsorbent solid material is incorporated into said layer.

2. Packing material for an elution chromatographic column comprising small bodies selected from the group consisting of glass beads, tin bronze beads, small stainless steel wire mesh rings and metal-coated glass beads which are inert and which are impervious with respect to a carrier fluid and each of which carries on their surfaces a porous layer of a material selected from the group consisting of metal oxides and carbon black which exists in a solid phase and is active at atmospheric temperatures and throughout a range of operating temperatures.

3. Packing material defined in claim 2, in which the porous layer consists essentially of adsorbent metal oxide particles having a specific surface of from about 15 to about 150 square meters per gram, said particles being coherent and forming a porous coating adherent to said core.

4. Packing material defined in claim 3, in which the metal oxide particles are predominantly $Al_2O_3$.

5. Packing material defined in claim 3, in which the metal oxide particles are predominantly $Fe_2O_3$.

6. Packing material defined in claim 3, in which the metal oxide particles are predominantly $ZrO_2$.

7. Packing material defined in claim 3, in which the metal oxide particles are predominantly $TiO_2$.

8. Packing material defined in claim 2, in which the active surface layers are impregnated with a high-boiling separating liquid.

9. Packing material defined in claim 8, in which the separating liquid is triethylene glycol.

10. Packing material for an elution chromatographic column comprising small bodies selected from the group consisting of glass beads, tin bronze beads, small stainless steel wire mesh rings and metal-coated glass beads which are inert and which are impervious with respect to a carrier fluid and having a substantially uniform diameter within the range of 0.05–.30 mm., each of said bodies carrying on their surfaces a porous layer of a material selected from the group consisting of metal oxides and carbon black which exists in a solid phase and is active at atmospheric temperatures and throughout an operating range of temperatures, said porous material having a thickness from about 1 to about 50 microns.

References Cited

UNITED STATES PATENTS

| 2,788,297 | 4/1957 | Louis | 117—109 |
| 3,005,514 | 10/1961 | Cole et al. | 55—386 |
| 3,014,815 | 12/1961 | Lely et al. | 177—109 |
| 3,048,029 | 8/1962 | Juvet | 55—386 |
| 3,232,782 | 2/1966 | Shannon | 177—100 X |
| 3,273,315 | 9/1966 | Mortimer | 55—67 |

FOREIGN PATENTS 594,400   3/1960   Canada.

OTHER REFERENCES

Glemser et al.: Angewandte Chemie, vol. 69, 1957, pp. 91–93.

Nikelly: Analytical Chemistry, vol. 34 (4), pp. 472–475.

REUBEN FRIEDMAN, *Primary Examiner.*

C. N. HART, *Assistant Examiner.*